Nov. 6, 1923.

A. H. HUMPHREYS

LINE HOOK

Filed Aug. 21, 1919

1,472,840

WITNESS:

INVENTOR.
Albert H. Humphreys,
BY
Arthur B. Jenkins
ATTORNEY.

Patented Nov. 6, 1923.

1,472,840

UNITED STATES PATENT OFFICE.

ALBERT H. HUMPHREYS, OF WOOLWICH, MAINE, ASSIGNOR OF ONE-HALF TO JOHN C. DE WOLF, OF MIDDLETOWN, CONNECTICUT.

LINE HOOK.

Application filed August 21, 1919. Serial No. 318,957.

*To all whom it may concern:*

Be it known that I, ALBERT H. HUMPHREYS, a citizen of the United States, residing in Woolwich, in the county of Sagadahoc and State of Maine, have invented a new and Improved Line Hook, of which the following is a specification.

My invention relates to the class of devices employed to anchor ropes, lines, &c., and an object of my invention, among others, is to provide a device of this class that shall be extremely simple and strong in its construction and one in connection with which a rope or line may be readily used to secure it in place.

One form of device embodying my invention and in the construction and use of which the objects herein set out, as well as others, may be attained, is illustrated in the accompanying drawings, in which—

Figure 1:
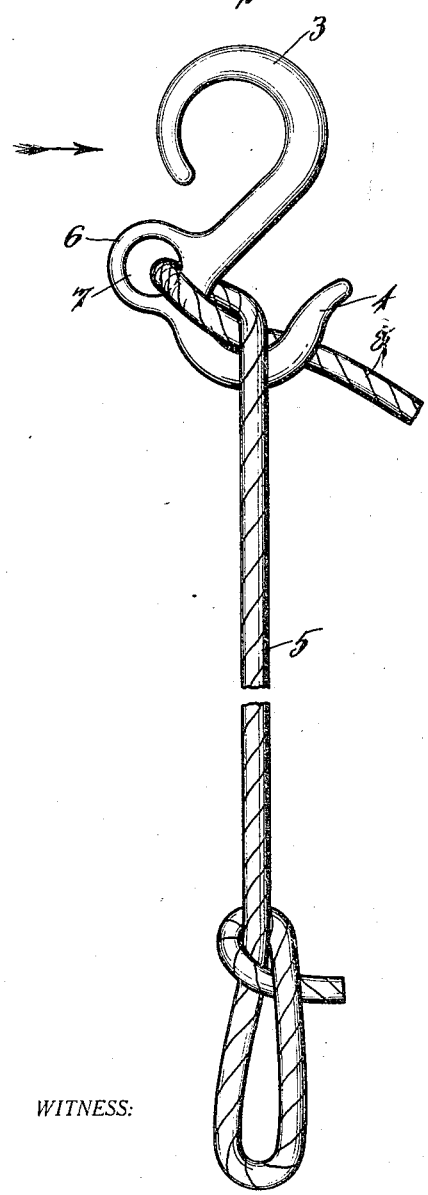
Figure 1 is a side view of my improved line hook.
Figure 2:
Figure 2 is an edge view of my improved hook.

My improved line hook contemplates two hooks as depicted in the accompanying drawings, the hook 3 being for the purpose of suspending the device or anchoring it in place and the hook 4 being employed to receive a hitch rope or line 5. In the preferred form of construction this device is in the shape of an S-hook, and back of the hitch hook 4 is an ear 6 through which a hole 7 is formed to receive the line.

In use the running end 8 of the line is passed through the opening 7 and underneath the main strand, the running end resting upon the hook 4 and the main line resting on the running end as clearly shown in the drawings. It will thus be seen that the full strain upon the main strand of the line is brought to bear upon the running end 8, thus securely fastening it against loosening, and yet at the same time, when the strain is released on the main strand of the line the running end is freely loosened.

In accordance with the provisions of the patent statutes, I have described the principles of operation of my invention, together with the device which I now consider to represent the best embodiment thereof; but I desire to have it understood that the device shown is only illustrative and that the invention may be carried out by other means within the scope of the appended claim.

I claim—

A line hook comprising an S shaped structure formed by and having two hooks, an extension on one side of the said structure and opposite the open end and on a line above the bottom of one of said hooks, said extension having a hole therethrough to receive the end of a line, all parts of the said structure being evenly disposed on a line passing through the edgewise center.

ALBERT H. HUMPHREYS.